United States Patent
Miyake

(10) Patent No.: US 9,732,843 B2
(45) Date of Patent: Aug. 15, 2017

(54) POWER TRANSMISSION UNIT FOR HYBRID VEHICLE

(71) Applicant: TOYOTA JIDOSHA KABUSHIKI KAISHA, Toyota-shi, Aichi-ken (JP)

(72) Inventor: Kohei Miyake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 8 days.

(21) Appl. No.: 15/013,288

(22) Filed: Feb. 2, 2016

(65) Prior Publication Data

US 2016/0223072 A1    Aug. 4, 2016

(30) Foreign Application Priority Data

Feb. 4, 2015   (JP) ................................ 2015-019986

(51) Int. Cl.
*F16H 57/04*    (2010.01)

(52) U.S. Cl.
CPC ..... *F16H 57/0483* (2013.01); *F16H 57/0475* (2013.01)

(58) Field of Classification Search
CPC .......................... F16H 57/0476; F16H 57/0435
See application file for complete search history.

(56) References Cited

U.S. PATENT DOCUMENTS

| | | | | |
|---|---|---|---|---|
| 5,821,653 A | * | 10/1998 | Kinto | B60K 1/00 310/58 |
| 8,857,188 B2 | * | 10/2014 | Noda | B60K 6/48 123/179.25 |
| 9,410,610 B1 | * | 8/2016 | Pritchard | F16H 57/045 |
| 2017/0066317 A1 | * | 3/2017 | Kurosaki | F16H 57/0424 |

FOREIGN PATENT DOCUMENTS

JP    2013-086654 A    5/2013

* cited by examiner

*Primary Examiner* — Sherry Estremsky
(74) *Attorney, Agent, or Firm* — Andrews Kurth Kenyon LLP

(57) ABSTRACT

A power transmission unit adapted to optimize an oil delivery amount to oil requiring site is provided. A selectable one-way clutch comprises a selector plate that is rotated to a position to bring the selectable one-way clutch into engagement, and to a position to bring the selectable one-way clutch into disengagement. The selector plate comprises a valve plate crossing an oil passage for delivering lubrication oil to the planetary gear unit. The valve plate comprises a through hole that is overlapped with the oil passage to open the oil passage by rotating the selector plate to the position to bring the selectable one-way clutch into engagement, and that is displaced from the oil passage by rotating the selector plate to the position to bring the selectable one-way clutch into disengagement.

4 Claims, 3 Drawing Sheets

POWER TRANSMISSION UNIT FOR HYBRID VEHICLE

The present invention claims the benefit of Japanese Patent Application No. 2015-019986 filed on Feb. 4, 2015 with the Japanese Patent Office, the disclosure of which is incorporated herein by reference in its entirety.

BACKGROUND

Field of the Invention

Preferred example relates to the art of a power transmission unit for hybrid vehicles having selectable one-way clutch adapted to selectively limit a torque transmission only in one direction.

Discussion of the Related Art

A hybrid vehicle is powered not only by an engine but also by a motor or motor-generator (as will be called the "motor" hereinafter). In order to distribute powers of those prime movers while changing a speed, the hybrid vehicle is provided with a planetary gear unit. One example of the hybrid vehicle of this kind is described in JP-A-2013-086654. The motor produces heat in both situations to be energized to generate a mechanical power and to be rotated passively to generate an electric power. Heat is also generated in the planetary gear unit as a result of torque transmission by a friction between gears. In order to cool and lubricate the motor and the planetary gear unit, in the hybrid vehicle taught by JP-A-2013-086654, lubrication oil is delivered to the motor and the planetary gear unit from an oil pump.

The lubrication oil is delivered to the motor and the planetary gear unit through oil passages formed in a housing and a rotary shaft, and hence an amount of oil delivered to the motor and the planetary gear unit is governed by a cross-sectional area of the oil passage. That is, a feeding amount of the oil to a lubrication site has to be fixed depending on the cross-sectional area of the oil passage in spite of a change in a torque transmitting condition of the planetary gear unit during activation of the motor. For this reason, a discharging amount of the oil pump has to be adjusted to the largest required amount of the oil for lubricating and cooling the lubrication site. That is, the oil is delivered excessively to the planetary gear unit even when the planetary gear unit is not transmitting torque and this may cause a power loss.

SUMMARY OF THE INVENTION

Aspects of preferred embodiment has been conceived noting the foregoing technical problems, and it is therefore an object of the preferred embodiment is to provide a power transmission unit adapted to optimize an oil delivery amount to the motor and the planetary gear unit of the hybrid vehicle utilizing a switching operation of engagement state of the selectable one-way clutch.

Preferred embodiment relates to a power transmission unit for a hybrid vehicle comprising: a planetary gear unit adapted to perform a differential action among at least three rotary elements; a motor connected to any one of the rotary elements of the planetary gear unit; a selectable one-way clutch that is brought into engagement to halt another rotary element to allow the planetary gear unit to transmit torque of the motor, and that is brought into disengagement to release said another rotary element to disable the planetary gear unit to transmit torque. In order to achieve the above-explained objective, according to the preferred example, the selectable one-way clutch is provided with a lubrication passage for delivering oil to the planetary gear unit, and a valve mechanism that selectively opens and closes the lubrication passage in response to a motion of the selectable one-way clutch. Specifically, the valve mechanism is adapted to close the lubrication passage when the selectable one-way clutch is in disengagement, and to open the lubrication passage when the selectable one-way clutch is in engagement.

The power transmission unit for a hybrid vehicle may be further provided with a main passage for letting through the oil; and a cooling passage branched from the main passage to deliver the oil to the motor. The lubrication passage may be branched from the main passage.

The selectable one-way clutch comprises a selector plate that is rotated to a position to bring the selectable one-way clutch into engagement, and to a position to bring the selectable one-way clutch into disengagement. The selector plate comprises a valve plate formed integrally therewith crossing the lubrication passage, and a through hole formed on the valve plate to selectively open the lubrication passage. Specifically, the through hole is overlapped with the lubrication passage to open the lubrication passage by rotating the selector plate to the position to bring the selectable one-way clutch into engagement, and that is displaced from the lubrication passage by rotating the selector plate to the position to bring the selectable one-way clutch into disengagement.

In addition, a cross-sectional area of the lubrication passage is larger than that of the cooling passage.

Thus, according to the preferred example, one of the rotary elements of the planetary gear unit is halted to enable torque transmission from the motor through the planetary gear unit by rotating the selector plate to the position at which the selectable one-way clutch is brought into engagement. Consequently, the valve mechanism is opened to enable oil delivery to the planetary gear unit. That is, the lubrication passage is opened to deliver the oil to the planetary gear unit to lubricate the planetary gear unit when the planetary gear unit transmits torque. By contrast, said one of the rotary elements of the planetary gear unit is released by rotating the selector plate to the position at which the selectable one-way clutch is brought into disengagement. In this case, said one of the rotary elements cannot serve as a reaction element and hence the planetary gear unit is disabled to transmit torque. In addition, the through hole of the valve mechanism is displaced from the oil passage to close the lubrication passage. Consequently, oil delivery to the planetary gear unit through the lubrication passage is stopped. According to the preferred example, therefore, the oil can be delivered to oil requiring sites in the requisite amount. In addition, an oil pump can be prevented from being driven excessively and hence power loss resulting from driving the oil pump may also be reduced.

As described, the lubrication passage and the cooling passage may be branched from the main passage. According to the preferred example, therefore, larger amount of oil may be delivered to the motor when the planetary gear unit is not transmitting torque and hence the lubrication passage is closed. For this reason, the motor can be cooled effectively.

In addition, since the valve plate is formed integrally with the selector plate and the through hole is formed on the valve plate, a structure for actuating the valve mechanism and a structure of the valve mechanism itself can be simplified.

Further, since the cross-sectional area of the lubrication passage is larger than that of the cooling passage, a large amount of oil can be delivered to the planetary gear unit during transmitting torque. According to the preferred example, therefore, a frictional power loss of the planetary gear unit can be reduced while limiting a damage on the planetary gear unit.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
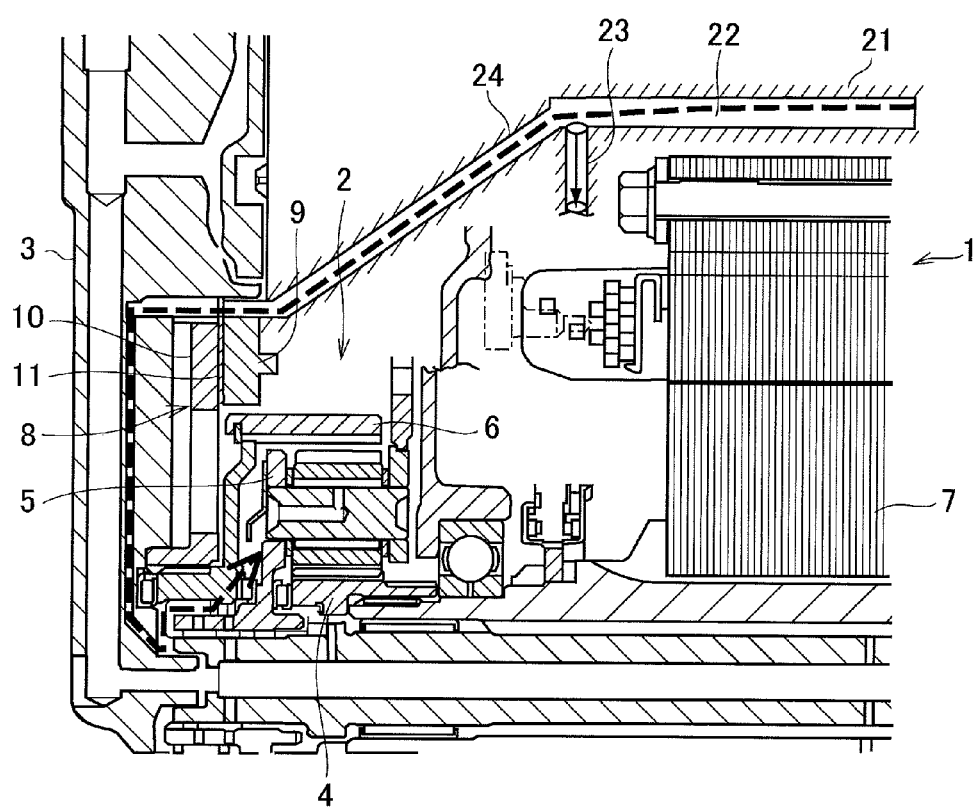
FIG. 1 is a partial cross-sectional view showing the power transmission unit according to the preferred example.

Referring now to FIG. 1, there is schematically shown a cross-section of the power transmission unit according to the preferred example. As illustrated in FIG. 1, in the power transmission unit, a motor 1 having a generating function and a planetary gear unit 2 are arranged coaxially. The motor 1 is rotated by a torque of an engine (not shown) to generate an electric power, and an engine speed is controlled by a reaction force of the motor 1 resulting from such generation of the motor 1. The planetary gear unit 2 adapted to selectively establish a high speed stage in which an engine speed is lowered. That is, the planetary gear unit may serve as an overdrive mechanism. Specifically, the planetary gear unit 2 is adapted to perform a differential action among a sun gear 4, a carrier 5 and a ring gear 6, and disposed between the motor 1 and the rear cover 3. The sun gear 4 is connected to a rotor 7 of the motor 1, and the carrier 5 is connected to a reaction element of a power distribution device (both not shown) that distributes power of the engine to the motor 1 side and to an output element (not shown). The ring gear 6 is selectively halted to serve as a reaction element (or a fixed element).

In order to selectively halt the ring gear 6, a selectable one-way clutch (to be abbreviated as "SOWC" hereinafter) 8 is arranged in the power transmission unit. The SOWC 8 comprises a pocket plate 9 and a notch plate 10 being opposed to each other, and a selector plate interposed between the pocket plate 9 and the notch plate 10. A plurality of pockets are formed in a circular manner on a face of the pocket plate 9 being opposed to the notch plate 10, and a strut is individually held in each pocket in a pivotal manner to project to or withdrawn from the notch plate 10. On the other hand, a plurality of notches are also formed on a face of the notch plate 10 facing to the pocket plate 9 at radially same level as the pockets and in the same number as the pockets. Likewise, a plurality of apertures (i.e., through holes) are also formed on the selector plate 11 at radially same level as the pockets and notches and in the same number as the pockets and the notches. In addition, the selector plate 11 is allowed to rotate in both directions to a position at which the apertures are individually overlapped with the pockets of the pocket plate 9 (i.e., to an engagement position), and to a position at which the apertures are individually displaced from the pockets of the pocket plate 9 (i.e., to a disengagement position). Specifically, when the selector plate 11 is rotated to the engagement position, a leading end of each strut held in the pocket is pushed into each notch of the notch plate 10 through each aperture of the selector plate 11 by a not shown spring or the like. By contrast, when the selector plate 11 is rotated to the disengagement position, the pockets are closed by the selector plate while pushing each strut into each pocket. The SOWC 8 thus structured is disposed coaxially with the planetary gear unit 2 in the vicinity of a rear cover 3. Specifically, an outer circumference of the pocket plate 9 is splined to the rear cover 3, and the notch plate 10 is connected to the ring gear 6.

Figure 2:
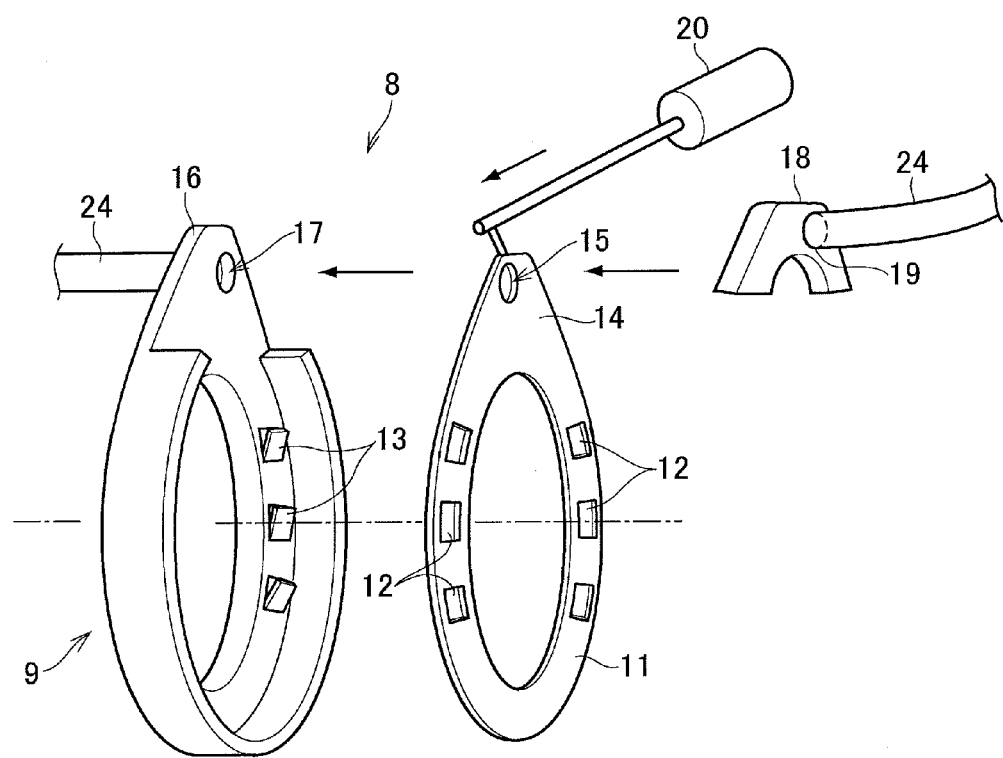
FIG. 2 is an exploded view of the selector plate of the SOWC.

Turning to FIG. 2, there are shown structural elements of the selector plate 11 in more detail. As depicted in FIG. 2, the selector plate 11 is an annular plate member having a plurality of apertures 12. As described, each of the strut 13 is individually pushed into the notch of the notch plate 10 through the aperture 12, and pushed into the pocket of the pocket plate 9 by the selector plate 11. An outer circumference of the selector plate 11 is partially protruded to form a valve plate 14, and a through hole 15 is formed on the valve plate 14.

An outer circumference of the pocket plate 9 is also partially protruded to form a protrusion 16, and a port 17 is formed on the protrusion 16. When the selector plate 11 is rotated to the aforementioned engagement position, the through hole 15 of the selector plate 11 is overlapped with the port 17 of the pocket plate 9 so that the port 17 is opened. By contrast, when the selector plate 11 is rotated to the aforementioned disengagement position, the through hole 15 of the selector plate 11 is displaced from the port 17 of the pocket plate 9 so that the port 17 is closed by the valve plate 14 of the selector plate 11. The valve plate 14 of the selector plate 11 is covered by a cover plate 18 while being allowed to rotate relatively with the protrusion 16 of the pocket plate 9, and the cover plate 18 is fixed to the protrusion 16 by a bolt or the like. Another port 19 is also formed on the cover plate 18 at a position to be overlapped with the port 17 of the pocket plate 9 so that another port 19 is also opened and closed by rotating the valve plate 14 of the selector plate 11.

An actuator 20 is arranged in an outer circumferential side of the selector plate 11, and a leading end of the actuator 20 is connected to the valve plate 14 to rotate the selector plate between the engagement position and the disengagement position. For example, a solenoid actuator reciprocated electromagnetically and a hydraulic cylinder reciprocated hydraulically may be used as the actuator 20.

Turning back to FIG. 1, there is shown an oil passage for delivering oil to the motor 1 and to the planetary gear unit 2. A main passage 22 penetrates through a casing 21 covering the motor 1, and the main passage 22 is branched into a first branch passage 23 as a cooling passage for the motor 1 and a second branch passage 24 as a lubrication passage for the planetary gear unit 2. Specifically, the first branch passage 23 is oriented to the motor 1 to deliver the oil to a rotational center of the motor 1 from outside. On the other hand, the second branch passage 24 is connected to the rear cover 3 while passing through the port 19 of the plate cover 18, the through hole 15 of the valve plate 14 of the selector plate 11, and the port 17 of the protrusion 16 of the pocket plate 9. That is, the valve plate 14 and the through hole 15 serve as a valve mechanism V for selectively opening and closing the second branch passage 24.

In order to deliver larger amount of the oil to the planetary gear unit 2 from the main passage 22 though the second branch passage 24 than that of the oil delivered to the motor 1 through the first branch passage 23, the second branch passage 24 is formed in such a manner to have a larger cross-sectional area (i.e., an inner diameter) A1 than a cross-sectional area (i.e., an inner diameter) A2 of the first branch passage 23 (A1<A2).

Here will be explained an action of the SOWC 8. When the selector plate 11 is rotated to the engagement position, the apertures 12 of the selector plate 11 are individually overlapped with the pockets of the pocket plate 9 so that the struts 13 held in the pockets are individually pushed into the notches of the notch plate 10 through each aperture 12. In this situation, if a negative torque is applied to the ring gear 6 integral with the notch plate to be rotated in an opposite direction to a rotational direction of the engine, the leading end of each strut 13 is individually brought into abutment to an inner wall of the notch to enable torque transmission between the notch plate 10 and the selector plate 11. Consequently, a rotation of the ring gear 6 in a counter direction opposite to the rotational direction of the engine is halted. In this case, since the ring gear 6 is thus halted, the carrier 5 is rotated in the in the forward direction by the negative torque of the motor 1. That is, the planetary gear unit 2 is allowed to transmit torque of the motor 1.

Figure 3:
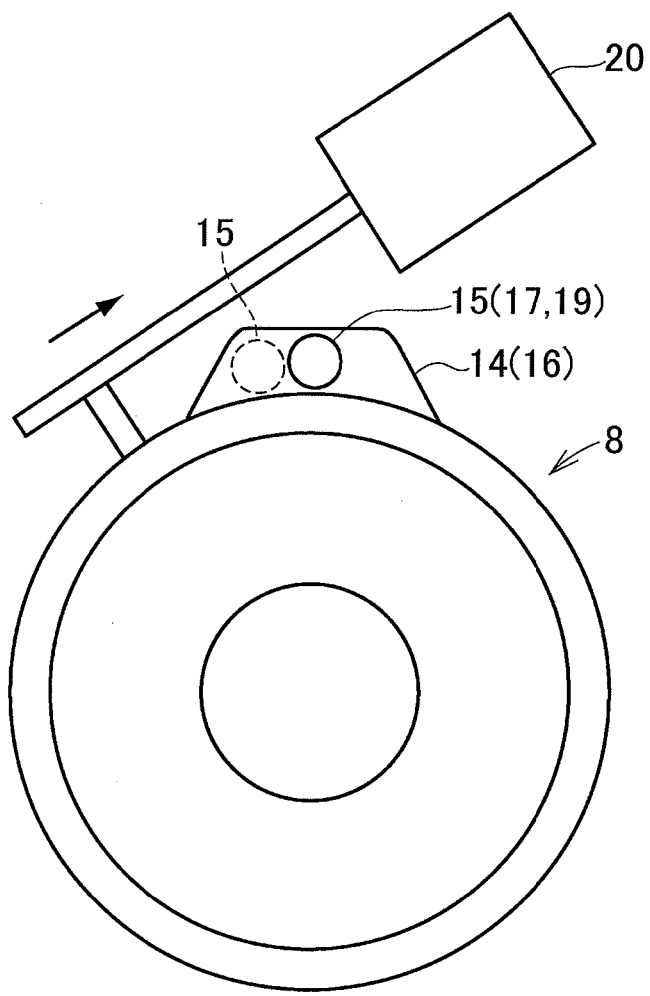
FIG. 3 is a front view of the selector plate showing positions of the through hole of the selector plate in an engagement position and a disengagement position.

When the selector plate 11 is rotated to the engagement position, the through hole 15 of the valve plate 14 of the selector plate 11 is overlapped with the port 17 of the pocket plate 9 and the port 19 of the plate cover 18 as a solid circle in FIG. 3 so that the ports 17 and 19 are opened to allow oil delivery through the second branch passage 24. Consequently, the lubrication oil is allowed to be delivered from the main passage 22 to the motor 1 through the first branch passage 23, while delivered to the SOWC 8 and to the planetary gear unit 2 through the second branch passage 24. The oil delivered to the planetary gear unit 2 is further delivered toward the rotational center thereof through clearances between rotary shafts and bearings. That is, when the SOWC 8 is brought into engagement, the planetary gear unit 2 is allowed to transmit torque of the motor 1, and oil delivery to the motor 1 and to the planetary gear unit 2 is enabled. In this situation, the oil is delivered to the motor 1 and to the planetary gear unit 2 at the above-mentioned distribution ratio determined by the cross-sectional area A1 of the second branch passage 24 and the cross-sectional area A2 of the first branch passage 23. According to the preferred example, therefore, the requisite amount of lubrication oil can be delivered to the heat generating elements such as the motor 1 and the planetary gear unit 2 to prevent overheating.

By contrast, when the selector plate 11 is rotated to the disengagement position, the through hole 15 of the valve plate 14 of the selector plate 11 is displaced to the position represented by the dashed line in FIG. 3 to close the port 17 of the pocket plate 9 and the port 19 of the plate cover 18. Consequently, the second branch passage 24 is closed and hence the oil delivery to the planetary gear unit 2 is reduced or stopped. In this case, the lubrication oil flowing through the main passage 22 is delivered entirely to the motor 1.

Thus, in the power transmission unit according to the preferred example, the lubrication oil will not be delivered excessively to the planetary gear unit 2 when the planetary gear unit 2 is not heated by friction resulting from torque transmission. According to the preferred example, therefore, a discharging amount of the oil pump can be suppressed. That is, the oil pump can be prevented from being driven excessively and hence power loss resulting from driving the oil pump may also be reduced. In addition, since the oil delivery to the heat generating elements is selectively enabled utilizing a switching operation of the SOWC 8, the oil delivery to the planetary gear unit 2 can be enabled only when the planetary gear unit 2 transmits torque by a simple mechanism.

What is claimed is:

1. A power transmission unit for a hybrid vehicle, comprising:
   a planetary gear unit adapted to perform a differential action among at least three rotary elements;
   a motor connected to any one of the rotary elements of the planetary gear unit;
   a selectable one-way clutch that is brought into engagement to halt another rotary element to allow the planetary gear unit to transmit torque of the motor, and that is brought into disengagement to release said another rotary element to disable the planetary gear unit to transmit torque;
   a lubrication passage for delivering oil to the planetary gear unit; and
   a valve mechanism that selectively opens and closes the lubrication passage in response to a motion of the selectable one-way clutch;
   wherein the valve mechanism is adapted to close the lubrication passage when the selectable one-way clutch is in disengagement, and to open the lubrication passage when the selectable one-way clutch is in engagement.

2. The power transmission unit for a hybrid vehicle as claimed in claim 1, further comprising:
   a main passage for letting through the oil; and
   a cooling passage branched from the main passage to deliver the oil to the motor;
   wherein the lubrication passage is branched from the main passage.

3. The power transmission unit for a hybrid vehicle as claimed in claim 1,
   wherein the selectable one-way clutch comprises a selector plate that is rotated to a position to bring the selectable one-way clutch into engagement, and to a position to bring the selectable one-way clutch into disengagement;
   wherein the selector plate comprises a valve plate formed integrally therewith crossing the lubrication passage, and a through hole formed on the valve plate to selectively open the lubrication passage; and
   wherein the through hole is overlapped with the lubrication passage to open the lubrication passage by rotating the selector plate to the position to bring the selectable one-way clutch into engagement, and that is displaced from the lubrication passage by rotating the selector plate to the position to bring the selectable one-way clutch into disengagement.

4. The power transmission unit for a hybrid vehicle as claimed in claim 2,
   wherein a cross-sectional area of the lubrication passage is larger than that of the cooling passage.

* * * * *